(Model.)
J. K. CUMMINGS.
COFFEE POT.
No. 362,878. Patented May 10, 1887.
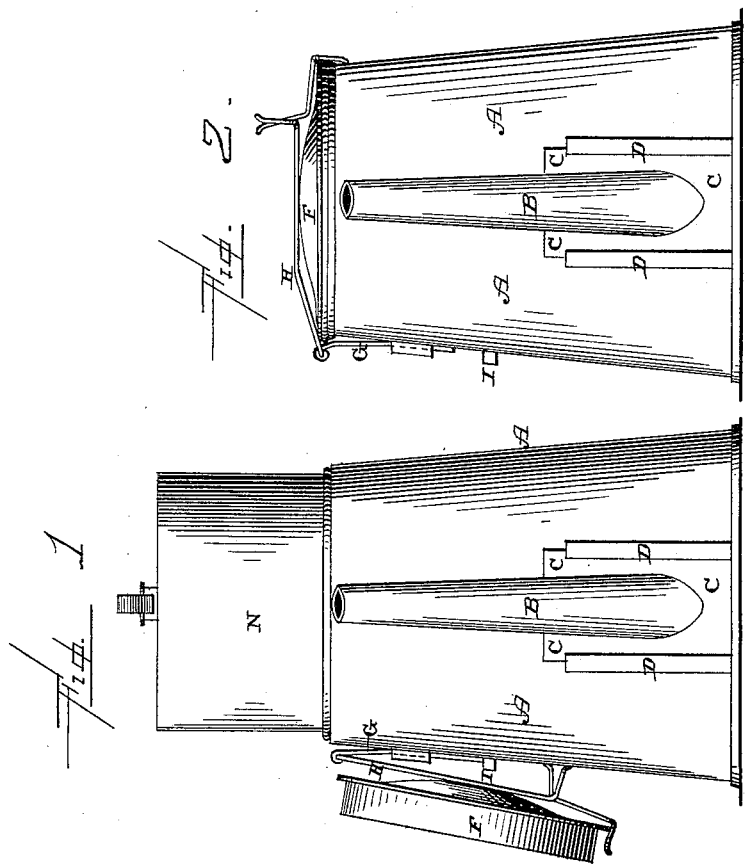

UNITED STATES PATENT OFFICE.

JAMES K. CUMMINGS, OF LADONIA, TEXAS.

COFFEE-POT.

SPECIFICATION forming part of Letters Patent No. 362,878, dated May 10, 1887.

Application filed July 20, 1886. Serial No. 208,539. (Model.)

*To all whom it may concern:*

Be it known that I, JAMES K. CUMMINGS, of Ladonia, in the county of Fannin and State of Texas, have invented certain new and useful Improvements in Coffee-Pots; and I do hereby declare the following to be a full, clear, and exact description of the invention, such as will enable others skilled in the art to which it pertains to make and use it, reference being had to the accompanying drawings, which form part of this specification.

My invention relates to an improvement in coffee-pots; and it consists in the arrangement and combination of parts, which will be more fully described hereinafter, and particularly pointed out in the claim.

The object of my invention is to produce a coffee-pot in which the cover is made adjustable, so as to be adapted to close over the top of the pot, or to be dropped back out of the way when the condenser is used.

Figure 1 is a front view of the coffee-pot complete, showing the lid turned back out of the way. Fig. 2 is a similar view showing the attachments removed and the cover upon the pot.

A represents a coffee pot of the ordinary construction, and B the spout. This spout, instead of being secured rigidly to the pot in the usual manner, is here made vertically adjustable, so as to open and close the opening in the side of the body through which the coffee is poured out. Secured to the spout at its lower end is a suitable plate of metal, C, which fits between the two guides D, formed upon the side of the coffee-pot. This spout and the plate of metal secured to its lower end are vertically adjustable between the two guides D, and can be moved upward until the upper end of the plate C strikes against a stop. While in this raised position the coffee can be freely poured out, because the opening or openings through the side of the coffee-pot come just opposite the lower end of the spout. When the lower end of the spout is depressed, the plate C closes the opening through the side of the coffee-pot, and thus prevents the steam and aroma from freely escaping, as it otherwise would do. After the coffee is poured out the spout is depressed by exerting a slight downward pressure upon its upper end. The plate C fits sufficiently tight against the side of the pot to prevent any leakage.

The cover F, instead of being hinged directly to the side of the coffee-pot in the usual manner, is connected to a sliding portion, G, of the hinge. This part G passes through suitable guides and is freely adjustable up and down. The other portion, H, of the hinge is loosely connected to the portion G and extends across the top of the cover, forming a spring-catch at its free end.

When the attachments are to be used with this coffee-pot, the part G of the hinge is forced downward as far as the stop I will allow, and then the cover drops back against the side of the pot out of the way. When, however, the attachments are removed, the part G is raised upward, and then the cover can be freely closed, as shown. By means of an adjustable hinge, as here shown, all necessity of having to separate the cover from the pot when the attachments are in use is done away with, and by keeping the cover constantly attached to the pot at all times the cover will never become displaced or lost.

Having thus described my invention, I claim—

The combination of the coffee-pot, the cover, the jointed parts G H, by means of which the cover is connected to the pot, and the guide through which the part G has a sliding movement, substantially as described.

In testimony whereof I affix my signature in presence of two witnesses.

JAMES K. CUMMINGS.

Witnesses:
JOS. LOGEROT,
B. S. JOHNSON.